United States Patent [19]

Shivak et al.

[11] 4,114,851
[45] Sep. 19, 1978

[54] HIGH PRESSURE VALVE

[75] Inventors: Robert A. Shivak, Parma; David J. Johnston, Sagamore Hills, both of Ohio

[73] Assignee: Sno-Trik Company, Solon, Ohio

[21] Appl. No.: 684,629

[22] Filed: May 10, 1976

[51] Int. Cl.² ............................................. F16K 25/00
[52] U.S. Cl. ..................................... 251/88; 251/122; 251/214; 251/264; 251/274; 251/360
[58] Field of Search ................... 251/84, 88, 214, 122, 251/264, 265, 273, 274, 357, 360

[56] References Cited

U.S. PATENT DOCUMENTS

| | | | |
|---|---|---|---|
| 1,733,421 | 10/1929 | Mauran | 251/360 |
| 1,898,519 | 2/1933 | Aull | 251/88 |
| 2,274,876 | 3/1942 | Trott | 251/88 |
| 2,981,284 | 4/1961 | Putnam | 251/214 |
| 3,049,332 | 8/1962 | Webster | 251/88 |
| 3,204,925 | 9/1965 | Montuori | 251/274 |
| 3,222,027 | 12/1965 | Gilleeny | 251/88 |
| 3,305,207 | 2/1967 | Calderoni et al. | 251/214 |
| 3,601,362 | 8/1971 | Gunther | 251/88 |
| 3,679,169 | 7/1972 | Bedo et al. | 251/88 |
| 3,761,053 | 9/1973 | Bedo et al. | 251/88 |
| 3,857,410 | 12/1974 | Bedo et al. | 251/214 |

*Primary Examiner*—Martin P. Schwadron
*Assistant Examiner*—G. L. Walton
*Attorney, Agent, or Firm*—Fay & Sharpe

[57] ABSTRACT

A high pressure valve of the type employing a non-rotating valve needle having a tapered tip which may be selectively moved between seated and unseated positions relative to a valve seat in a valve chamber. The valve seat is tapered inwardly and has a smaller taper angle than the valve needle. A valve actuating stem is received through a valve packing nut with the actuating stem having a bifurcated inner end defined by a transverse, generally rectangular bore intersected by an axially directed slot. The slot is somewhat smaller in breadth than the width of the bore and extends between the bore and the innermost end of the stem. The valve needle includes an enlarged cylindrical or spherical connecting end adapted to be received in the actuating stem bore and slot. Sealing for the needle is provided by a sealing medium comprised of a combination of a seal member received between a pair of seal washers in an enlarged coaxial area at one end of the valve chamber. The innermost end of an alignment bushing received over the valve needle applies a compressive force against the sealing medium with the opposite end of the bushing being positively located and engaged by the packing nut to properly center the needle in the valve chamber. The inlet passage into the valve chamber may be configured so as to receive and locate a replaceable seat member. An improved adjustable locking bracket is employed to retain the packing nut in a final adjusted position relative to the valve body.

15 Claims, 10 Drawing Figures

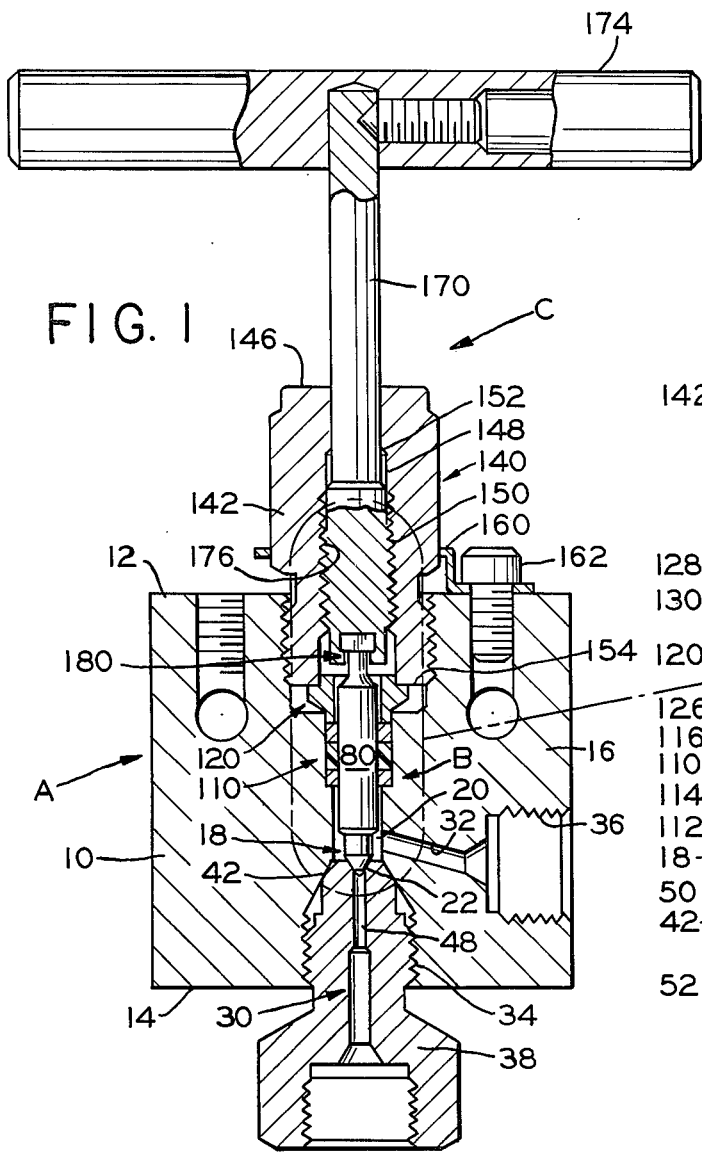
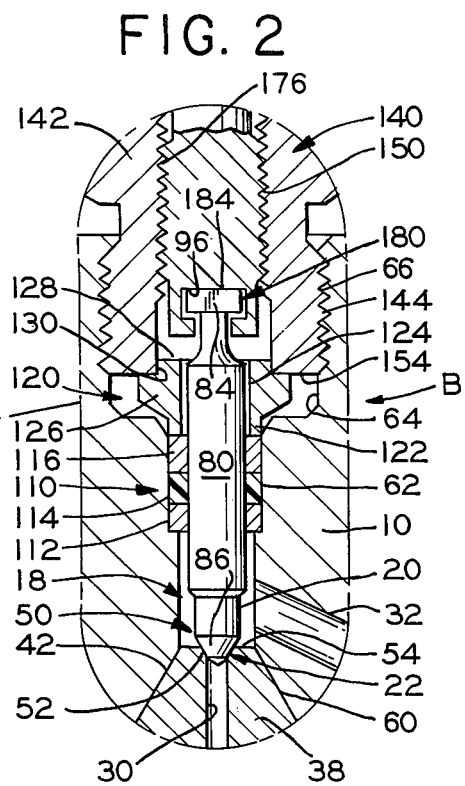
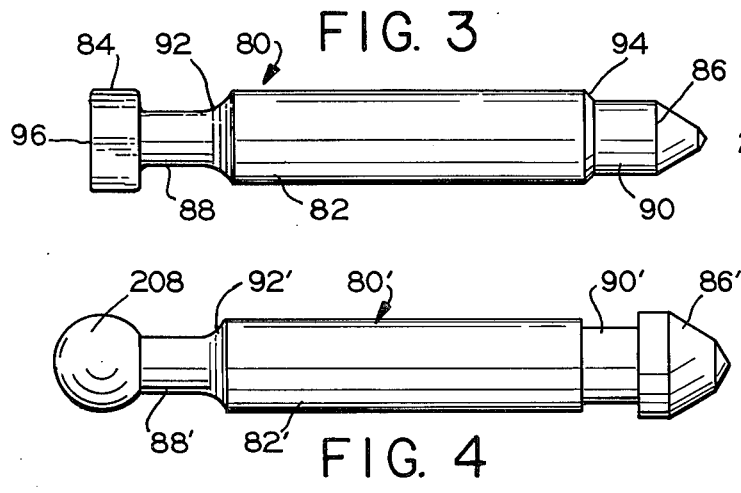
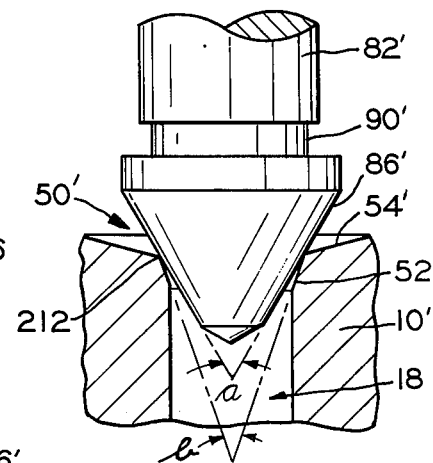

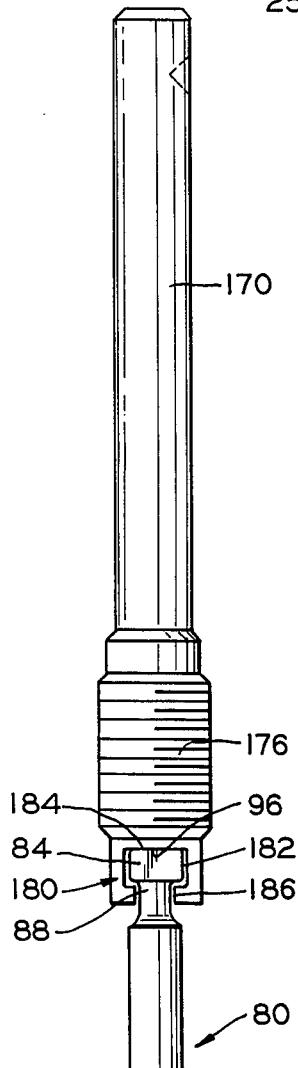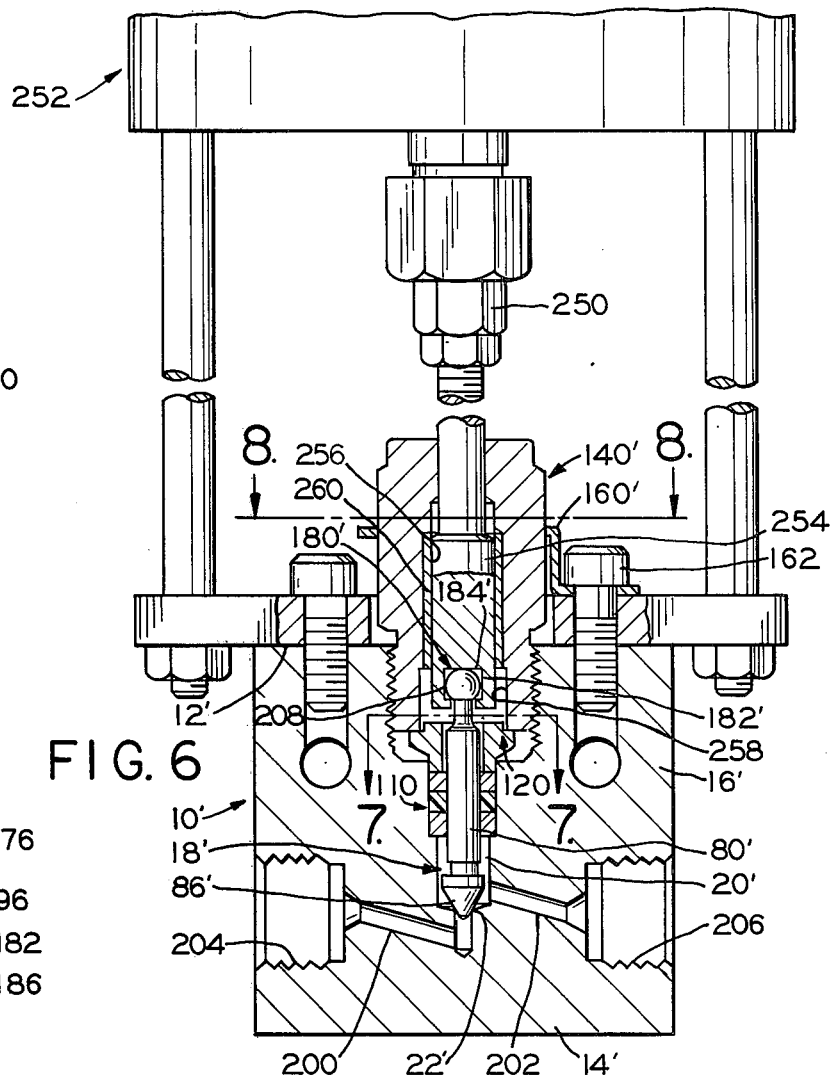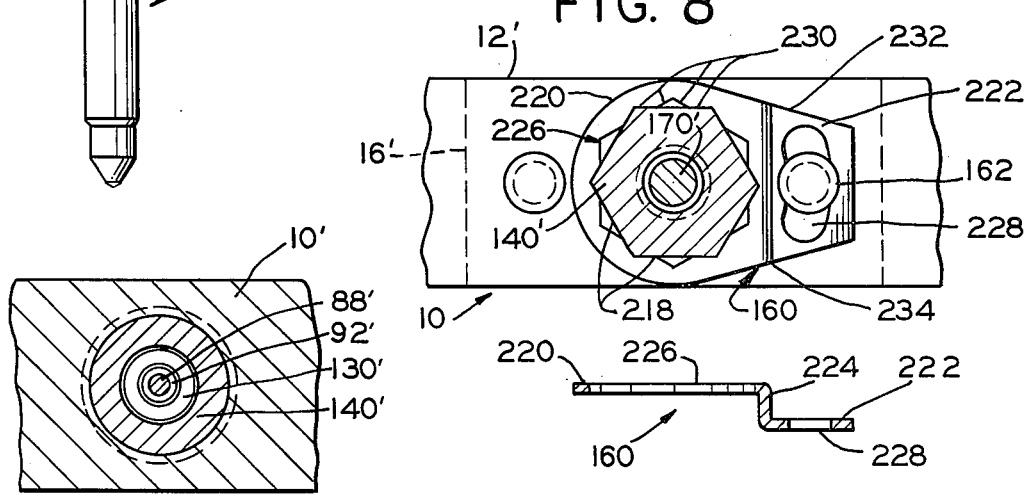

HIGH PRESSURE VALVE

BACKGROUND OF THE INVENTION

This invention pertains to the art of valves and more particularly to high pressure valves.

The invention is particularly applicable to high pressure valves of the type which include a non-rotating valve needle and will be described with particular reference thereto; however, it will be appreciated by those skilled in the art that the invention has broader applications and may be used in other apparatus and environments.

Heretofore, there have been a number of prior high pressure valves of the type to which the subject invention is particularly directed. Typical of these are the valves shown in the commonly assigned U.S. Pat. Nos. 3,679,169 and 3,761,053, the teachings of which are incorporated hereinto by reference. In these prior valves, however, the necessity for changing certain design and operational characteristics has become apparent.

For example, prior valves have employed an actuating stem including a bifurcated inner end which receives the uppermost end of the valve needle in a manner to permit relative rotation therebetween so that as the actuating stem is rotated in cooperating threads to obtain axial movement thereof, the valve needle will not be rotated but simply be moved in an axial direction. To retain the valve needle in a coaxial relationship with the actuating stem so that proper seating of the needle against the valve seat would be obtained and to prevent distortion of the bifurcated area thereof, it was found preferable to include a retaining ring surrounding the lowermost end of the bifurcated stem area.

An alignment bushing disposed between the innermost end of the valve packing nut and the stem or needle sealing medium is required for purposes of placing the necessary and desired compressive force against the sealing medium to obtain the desired sealing characteristics. Furthermore, the alignment bushing functions as alignment means for the valve needle so that the needle will be retained in a coaxial relationship with the valve chamber. To accomplish this, prior valve designs have employed alignment bushings dimensioned to be closely received in that portion of the valve bore receiving the sealing medium so that positive valve needle alignment could be obtained. The necessity for maintaining close tolerances between the bore and the lead end of the alignment bushing caused some difficulty in obtaining the desired relationship between the components and has added some additional manufacturing cost to the valve structure.

Prior valve designs of the general type to which the subject invention is particularly directed have typically employed a bronze bushing or liner disposed between the packing nut and actuating stem with bushing and stem being in threaded communication with each other. The packing nut and actuating stem are usually manufactured from steel so that if there was direct threaded contact between the actuating stem and packing nut, there could be undesirable galling between the corresponding threads. The necessity for using the bronze liner, while solving the problem of galling, has also added some manufacturing costs to the valve.

In addition, valves of the general type to which the subject invention is directed have employed rather complicated structural arrangements between the bifurcated inner end of the actuating stem and the valve needle to achieve desired non-rotation of the valve needle when the actuating stem was rotated relative to the valve body. These structural arrangements have typically included a cylindrical slot through the bifurcated inner end of the actuating stem with the valve needle having a corresponding spherical area at the outermost end thereof closely received in this cylindrical slot. Other arrangements have employed separate ball bearing means disposed between the bifurcated inner end of the actuating stem and the outer end of the valve needle. Both of these arrangements necessitated undesired special and difficult machining operations.

Because of the necessity for applying a compressive force to the sealing medium, the packing nut must be adjusted to a final position in the valve body so that the innermost end thereof would engage the alignment bushing to exert the desired compressive force against the sealing medium. The packing nut is threadedly received by the valve body so that once a final adjusted position has been obtained, it is desirable to retain the packing nut in that position with some assurance that it will not be moved therefrom. Accordingly, locking brackets have been utilized for this purpose and while some prior locking brackets have been known such as those shown in the commonly assigned U.S. Pat. Nos. 3,679,169 and 3,761,053, these prior brackets have had certain disadvantages. For example, prior brackets have generally been configured so that when the packing nut was in certain final adjusted positions, the body of the locking bracket would overhang the valve body thereby rendering it possible for clothing, tools, equipment and the like to catch thereon and cause possible injury or valve damage. Moreover, and due to the specifics of these prior locking bracket designs, they were not adjustable to the extent required to provide a full range of locking positions for the associated packing nuts.

Finally, the valve seat designs in the prior valve designs of the type to which the subject invention is directed have simply been defined by a relatively sharp lip positively engaged by the tip of the valve needle to achieve a valve closed position. During normal operation of the valves, the lip tends to become coined to the tip shape and, the higher the pressure of the fluid system, the greater the coining force. Eventually, at high system pressures, this results in a work hardened seat surface which is in an ultimate plastic state. This plastic state is unacceptable for effective and extended valve operation and life.

The present invention contemplates a new and improved article which overcomes all of the above referred to problems and others and provides a new high pressure valve which is relatively simple, more economical to manufacture, has a longer effective life at particularly high pressures and which may be readily adaptable to any number of uses in high pressure systems.

BRIEF DESCRIPTION OF THE INVENTION

In accordance with one aspect of the present invention, there is provided a valve comprised of a valve body having an open ended valve chamber including a valve seat disposed between inlet and outlet passages. An actuating stem having inner and outer ends is associated with the valve body and operably communicates with a valve needle member disposed in the valve chamber. The valve needle has a generally cylindrical main body portion with one end operably communicating with the inner end of the stem and the other end including a tip adapted to cooperate with the seat. The valve needle is selectively movable by the stem between a first closed position with the tip engaging the seat and a second opened position with the tip spaced from the seat. A sealing medium is located in the valve chamber spaced from one side of the valve seat and is comprised of an annular shaped first seal washer, a seal member and a second seal washer. The first seal washer is disposed in the chamber adjacent the valve seat and has a bore slightly larger than the diameter of the valve needle to provide a sliding fit therefor. The seal member is closely received over the valve needle and disposed in the chamber adjacent the first seal washer. The second seal washer is disposed in the chamber adjacent the seal member and has a bore slightly larger than the diameter of the valve needle to provide a sliding fit therefor. A valve needle alignment bushing is disposed adjacent the second seal washer and is slidingly received over the valve needle. This bushing has a first surface engaging the second seal washer for applying a compressive force to the sealing medium and a second surface including means for positively engaging a driving surface on a packing nut. A packing nut is threadedly received in the valve body coaxially with the valve chamber. This nut has an innermost end comprising a driving surface adapted to cooperate with the alignment engaging means for centering the bushing in the valve chamber and urging it against the second seal washer for applying a compressive force against the sealing medium.

In accordance with another aspect of the present invention, the stem has a bifurcated inner end comprised of a transverse bore having a generally rectangular cross section and an axially directed slot extending from this transverse bore to the innermost end of the stem with the slot having a breadth somewhat smaller in magnitude than that of the bore. The one end of the valve needle includes connecting means adapted to be received in the stem bifurcated inner end in a manner so as to permit relative rotation between the stem and valve needle.

In accordance with a further aspect of the present invention, the alignment bushing first surface comprises one end face of the bushing and the second surface comprises the opposite end face of the bushing. The engaging means comprises a generally L-shaped groove disposed around the outer periphery of the opposite end face with at least a portion of the innermost end of the packing nut adapted to be closely received in this groove.

In accordance with still another aspect of the present invention, the valve seat has a generally frusto-conical configuration tapering inwardly from an entrance area and the valve needle tip includes a frusto-conical area adapted to engage the seat when the valve needle is moved into the first or valve closed position. The degree of taper of the valve seat is desirably made to be less than the degree of taper of the valve needle tip.

In accordance with still a further aspect of the present invention, there is provided an improved locking bracket of the type adapted to retain a member having a multi-sided peripheral side wall such as a packing nut in a particular desired adjusted position relative to a rigid body such as a valve body.

The principal object of the present invention is the provision of a new and improved high pressure valve of the non-rotating valve needle type.

Another object of the present invention is the provision of a new and improved high pressure valve which reduces manufacturing costs.

Still another object of the present invention is the provision of a new and improved high pressure valve which provides extended valve life at elevated system pressures.

BRIEF DESCRIPTION OF THE FIGURES

The invention may take physical form in certain parts and arrangement of parts, preferred embodiments of which will be described in detail in this specification and illustrated in the accompanying drawings which form a part hereof and wherein:

FIG. 1 is a partial cross-sectional view of a high pressure valve of the non-rotating valve needle type incorporating the concepts of the invention;

FIG. 2 is an enlarged view of a portion of the valve of FIG. 1 showing particularly the inner workings thereof;

FIG. 3 is one embodiment of a valve needle incorporating the concepts of the subject invention;

FIG. 4 is an alternative embodiment of a valve needle incorporating the concepts of the subject invention;

FIG. 5 is a view showing the valve actuating stem and valve needle of the valve shown in FIG. 1 as well as the interconnection therebetween.

FIG. 6 is a partial cross-sectional view of a modified valve structure incorporating the concepts of the subject invention;

FIG. 7 is a cross-sectional view taken along lines 7—7 of FIG. 6;

FIG. 8 is a cross-sectional view taken along lines 8—8 of FIG. 6 showing the new and improved locking bracket;

FIG. 9 is a cross-sectional view of the locking bracket itself; and,

FIG. 10 is an enlarged view of a portion of the valve in FIG. 6 showing in detail the particular relationship between the valve needle tip and valve seat.

DESCRIPTION OF THE PREFERRED EMBODIMENT

Referring now to the drawings wherein the showings are for purposes of illustrating the preferred embodiments of the invention only and not for purposes of limiting same, the FIGURES show a valve body A, valve needle and packing or sealing arrangement B and a valve operator C. Certain of the general component structures employed in practicing the present invention are shown in the commonly assigned U.S. Pat. Nos. 3,679,169 and 3,761,053, previously identified.

More specifically and with primary reference to FIGS. 1 and 2, the valve shown comprises what is commonly referred to as an angle pattern valve wherein the valve body includes a body portion 10 having a top end 12, a bottom end 14 and a continuous side wall 16. Extending longitudinally through body 10 between top and bottom end 12,14 is a bore 18 having portions of various diameters axially spaced therealong for reasons which will become apparent hereinafter. A portion of bore 18 adjacent bottom end 14 acts to define a valve chamber 20 having a valve seat 22 defining the lowermost end of chamber 20.

Extending through body 10 and communicating with bore 18 on one side of the valve seat 22 is a first fluid flow passage 30 which, in this embodiment, is included in an end fitting as will be described in greater detail. A second fluid flow passage 32 extends through the valve body and communicates with valve chamber 20 on the other side of valve seat 22. Adjacent the outermost ends of passages 30,32 are threaded fitting receiving areas 34,36 respectively. Receiving area 34 is adapted to receive a special threaded fitting 38 which includes a particular seat arrangement to be described hereinafter. Fitting 38 may, along with receiving area 36, receive conventional fluid couplings or fittings therein in order that the valve may be conveniently incorporated into a fluid system. Inasmuch as such features, insofar as they relate to incorporating the valve into a fluid system, are deemed known and do not form a part of the present invention, they are not discussed or shown in greater detail. Although valve body 10 could be constructed from a variety of different materials, an austenitic stainless steel is particularly preferred.

Valve seat 22 in FIGS. 1 and 2 is an integral part of fitting 38 at one end thereof. The end of fitting 38 adjacent the valve seat has a frusto-conical configuration 42 and a fluid opening 48 extends through the fitting between the opposite end faces thereof. As best shown in FIG. 2, the innermost end of fitting 38 which includes valve seat 22 has an entrance area generally designated 50 with a tapered seat area 52 disposed therein. End face 54 is in a plane generally normal to the axis of fitting 38 although it could be slightly inwardly tapered for reasons which will become apparent hereinafter. Tapered seat area 52 has a different taper than the tip of the associated valve needle to achieve improved valve operation as will also hereinafter be discussed in greater detail. To accommodate and properly locate frusto-conical end 42 relative to the valve body, there is provided a frusto-conical area 60 connecting enlarged threaded area 34 of bore 18 and valve chamber 20.

Use of the valve body arrangement particularly shown in FIGS. 1 and 2 facilitates ready replacement of the valve seat by merely removing fitting 38 which includes the valve seat as a part thereof and replacing it with a new fitting. Although fitting 38 may be formed from any number of materials without departing from the intent or scope of the invention, austenitic stainless steel is particularly preferred.

Adjacent valve seat 22 and spaced a short axial distance therefrom on the other side of chamber 20 toward top end 12, bore 18 expands into a slightly larger diameter bore portion 62 which defines a sealing medium receiving area. Adjacent the upper end of this larger diameter portion is an outwardly flaring and still further enlarged diameter bore portion 64 having threads 66 disposed longitudinally along a section thereof from top end 12. The effect and use of bore portions 62,64 will become apparent hereinafter.

Disposed within bore 18 for selective reciprocation therein to effect valve opening and closing to control fluid flow through and between passages 30,32 is a valve needle member generally designated 80 in FIGS. 1, 2, 3 and 5. This valve needle member has an elongated cylindrical main body portion 82 including connecting means generally designated 84 at one end and a valve needle tip generally designated 86 at the other end. Connecting means 84 is connected to main body portion 82 by a smaller diameter body portion 88 and a needle tip 86 is connected to main body portion 82 by another smaller diameter body portion 90. The corners of connecting means 84 of the area of interconnection between the connecting means and portions 88 are radiused slightly. Also, the interconnections between body portions 88,82 and 90,82 are by means of radiused area 92 and tapered area 94, respectively.

Connecting means 84 has a generally cylindrical configuration with a generally flat outer or end bearing surface or face 96. Connecting means 84 with end face 96 comprises what may be descriptively referred to as a nailhead connecting arrangement. Tip 86 tapers inwardly from adjacent smaller diameter body portion 90 and the vertex angle of this taper is greater than the vertex angle of tapered seat area 52 as will be described in greater detail hereinafter. Reduced diameter area 90 provides a greater clearance between that area and the side wall of chamber 20 which effectively reduces the potential for wire drawing of the valve needle member under elevated system pressures. Although various materials could be employed for valve needle 80, stainless steel is preferred.

With particular reference to FIGS. 1 and 2, a sealing or packing medium generally designated 110 is received in enlarged area 62 of bore 18. In the preferred arrangement here under discussion, this medium is comprised of a first seal washer 112 disposed at the interface between chamber 20 and enlarged bore 62, a seal member 114 disposed adjacent first seal washer 112 and a second seal washer 116 disposed adjacent seal member 114. Seal washers 112,116 are generally annular shaped having outside diameters slightly less than the diameter of bore 62 and inside diameters slightly in excess of the outside diameter of main body portion 82 of valve needle member 80. Seal member 114 is also generally annular shaped and has an outside diameter slightly less than the diameter of bore 62 with an internal diameter slightly larger than the outside diameter of main body portion 82 of valve needle member 80. In the preferred arrangement here under discussion, washers 112,116 are preferably constructed from stainless steel and act as containment means for seal member 114 which is preferably constructed from a 20% glass filled polytetrafluoroethylene. The seal member will be axially compressed and radially expanded when a compressive force is applied to the sealing medium in order that the seal member will seal against the valve needle member. Of course, other rigid materials could also be employed for washers 112,116 and other compressible materials could be employed for seal member 114 without departing from the scope and intent of the present invention. For example and for valve use in high temperature systems, the seal member could be constructed from corrosion preventive asbestos INCONEL or laminations of GRAFOIL.

An alignment bushing generally designated 120 includes a cylindrical forward or lead portion 122, an internal axial passageway 124 and a flange portion 126. Forward or lead end 122 is dimensioned to have a cylindrical configuration with an outside diameter slightly less than the diameter of bore portion 62 in order that at least a portion of lead end 122 may be received therein. The outer face of flange portion 126 defines a thrust surface 128 and extending around the outer periphery of thrust surface 128 in communication with the outer peripheral wall of flange portion 126 is a generally L-shaped groove 130. This groove is important in that it cooperates with the valve packing nut automatically aligning the bushing in bore 18 as will be described hereinafter in greater detail. The alignment bushing is also preferably constructed of stainless steel although other materials could again be advantageously employed.

A valve packing nut 140 having a generally cup-like configuration is threadedly received in threaded portion 66 of enlarged diameter bore 64 adjacent top end 12 of the valve body. Specifically, this nut includes an outer peripheral surface 142 having a plurality of threads 144 extending axially therealong over a portion thereof from the open end thereof toward the closed or top wall 146 and which threads are adapted to threadedly engage threads 66. The packing nut includes an axial passageway 148 extending therethrough having threads 150 disposed partially there along from the open end toward closed or top wall 146 and the top wall itself defines an internal shoulder 152. Packing nut 140 includes the conventional external hex configuration which is adapted to be engaged by a tool or other suitable instrument for purposes of threadedly rotating the packing nut relative to the valve body.

The lower extremity of the packing nut, that is, the open end of the cup-like configuration defines a driving surface 154 which lies in a plane generally parallel to alignment bushing thrust surface 128 and which is closely received in L-shaped groove 130 of the alignment bushing. When the valve is assembled, the cooperation between the packing nut and alignment bushing is such that driving surface 154 is received in groove 130 with a portion of flange portion 126 adjacent thrust surface 128 being closely received in passageway 148 of the packing nut. This arrangement assures that there is positive and precise location between the alignment bushing and packing nut so that the alignment bushing will be axially aligned in bore 18 in a manner precisely and positively locating valve needle member 80. The flat bottom surface of groove 130 which engages packing nut driving surface 154 may be considered an alignment bushing driving surface. The vertical cylindrical surface of groove 130, and the peripheral wall of the bore in packing nut 140 which faces such cylindrical surface, may be considered cooperating alignment surfaces engageable generally radially of the longitudinal axis of valve needle 80 to axially align bushing 120 with respect to packing nut 140 and to center alignment bushing 120 coaxially in valve chamber 20. Packing nut 140 is advantageously constructed from bronze in the preferred arrangement to eliminate galling between threads 150 and communicating threads on the actuating stem. This structural arrangement eliminates the bronze bushing or liner heretofore required in the packing nut to prevent galling. Of course, other materials may be advantageously employed for particular applications such as, for example, high-temperature applications and the like without departing from the intent and scope of the present invention. By way of example of one such alternate material, stainless steel could be employed. Threads 150 could then be plated to prevent galling.

A locking bracket or keeper 160 suitably operates against the outer hex configuration of the packing nut in order to retain the nut in the final adjusted position. Once the packing nut has been adjusted to obtain the appropriate compression force applied by driving surface 154 of the packing nut through alignment bushing 120 and against sealing or packing medium 110 to realize proper sealing, locking bracket 160 is employed to retain the packing nut in the final adjusted position. Bracket 160 is mounted to valve body 10 by a suitable mechanical fastener 162 engaging the valve body itself generally at the center of the width of the top end 12. The specific construction of the new locking bracket will be discussed hereinafter in greater detail.

Actuating stem or shaft 170 is best shown in FIGS. 1, 2 and 5 in relationship to valve needle member 80. This actuating stem comprises an elongated member having a conventional handle 174 affixed at the outermost end thereof by convenient means with a slightly enlarged threaded area 176 disposed adjacent the other end thereof adapted for threaded engagement with threads 150 in packing nut passageway 148. The actuating stem includes a bifurcated inner end generally designated 180 which defines a valve needle member receiving area. This bifurcated inner end is comprised of a generally rectangular transverse through bore 182 having a generally flat top wall or bearing surface 184. A slot 186 extends from the innermost end of the shaft to the bore itself and has a width slightly less than the width of bore 182.

Connecting means 84 of the valve needle member is dimensioned so as to be slidably received in transverse bore 182 and smaller diameter body portion 88 is dimensioned to be slidably received in slot 186 as shown in the drawings. The valve needle and actuating stem are thus positively linked together in a manner such that when the actuating stem is rotated through the threaded interconnection between the stem and packing nut, the valve needle member will only have axial movement and will not thereby cause damage to the valve seat when the valve member is moved between the valve opened and closed positions. Since the interconnection between the valve needle member and actuating stem is a sliding one and in view of the fact that seal member 114 closely embraces the outer surface of valve needle main body portion 82, little or no rotational movement of the valve needle is permitted during rotation of the actuating stem. If rotation of the valve needle member were permitted, there is a substantial possibility that galling between the valve needle tip and the valve seat could occur when the valve is moved to the closed condition with the tip engaging the valve seat.

Flat end face 96 of the valve needle and top wall 184 of bore 182 in the actuating stem cooperate with each other when the valve is closed so that there is more adequate distribution of forces. Again, connecting means 84 and end face 96 define a nail head like configuration which facilitates such a better distribution of forces by means of enlarged bearing surfaces. The use of the generally rectangular shaped transverse bore 182 is deemed to reduce manufacturing costs in that it is much easier to machine than has heretofore been the case with generally cylindrical bores or the other prior art arrangements were used. In fact, it is possble to machine the rectangular bore utilizing fairly inexpensive broaching techniques. In the preferred embodiment of the valve, the actuating stem is constructed from stainless steel although other materials could also be advantageously employed.

Because alignment bushing 120 is positively located by means of packing nut 140 engaging circumferential groove 130, the alignment bushing will automatically be retained in a precise desired relationship relative to bore 18, that is, substantially coaxial therewith. Accordingly, the cooperative arrangement between the alignment bushing and packing nut acts as a self alignment means for valve needle member 80 since passage 124 in the bushing is axially disposed and closely slidably receives the needle member. For this reason, it is unnecessary that forward portion 122 be as carefully or closely dimensionally machined relative to bore 62 as has heretofore been necessary with similar valves. In fact, with the design of the subject invention, forward portion 122 need not actually have to enter bore 62 to any degree as has heretofore been necessary to obtain proper alignment and sealing, and is dimensioned in conjunction with the dimensioning of sealing medium 110 so as to only come to bore 62 or enter it slightly. Furthermore, because of the resulting self aligning relationship between the valve needle member, alignment bushing and packing nut, any concerns directed to the proper alignment between these three components occasioned by the lack of positive locating relationships therebetween and which has heretofore required the use of retaining rings or the like as well as closely held tolerances between the alignment bushing and valve bore have been eliminated.

FIGS. 4 and 6–10 disclose a slightly modified arrangement for the valve body, the valve seat, the valve needle member, the actuating stem and the bonnet nut as well as a more specific showing of locking bracket 160. The actuating stem and bonnet nut are such that the valve may be operated by remote control valve actuator means. Means of the components of these alternative arrangements substantially correspond to those components hereinabove described with reference to FIGS. 1–3 and 5. Moreover, the slightly modified arrangements shown in FIGS. 4 and 6–10 are readily adaptable to and interchangeable with the arrangement shown in FIGS. 1–3 and 5 and described in detail hereinabove. For this reson, like components will be identified by like numerals with the addition of a prime (') suffix and new components will be identified with new numerals.

With reference to FIGS. 6 and 10, value body 10' includes a bore 18' extending inwardly from top end 12' toward bottom end 14'. The valve shown in this arrangement is a straight pattern valve and 18' is therefore not a through bore. Valve seat 22' is disposed along bore 18' and the seat comprises an integral part of the valve body. A first fluid passage 200 extends through the valve body into communication with bore 18' on one side of valve seat 22' and a second fluid passage 202 extends through the valve body into communication with bore 18' on the other side of the valve seat. Enlarged threaded areas 204,206 are disposed at the outermost ends of passages 200,202, respectively, in order to receive conventional fluid couplings or fittings as hereinabove described with reference to FIG. 1.

In this embodiment, and with particular reference to FIG. 4, the valve needle member 80' shown therein has been slightly modified. In this particular arrangement, generally cylindrical or nail head connecting means 84 shown in FIG. 3 has been replaced by a generally sperical connecting means 208. Moreover, smaller diameter body portion 90' has a diameter less than that of both main body portion 82' and largest diameter area of tip 86'. As shown in FIG. 6, connecting means 208 of valve needle member 80' is receivable in bifurcated inner end 180' of actuating stem or shaft 170'. Here, however, the bearing surface between connecting means 208 and top wall 184' of transverse bore 182' will not have the same degree or amount of coacting surface area between them as in the FIG. 1 arrangememt. To compensate for this if desired, it would be possible to machine transverse bore 182' in a manner so as to have a circular cross-section as has been done heretofore.

Attention is next particularly invited to FIG. 10 showing an enlarged view of the structural arrangement for the valve seat and needle member top as well as the cooperation therebetween. As noted therefrom, valve seat area 52' is generally frusto-conical in configuration tapering inwardly from entrance area 50'. The interface between the valve chamber and the lower portion of bore 18' is also tapered slightly inwardly as at face 54'. Valve needle tip 86' also tapers inwardly, however, the taper of the tip and valve seat are purposely made to differ from each other in order to achieve improved valve sealing characteristics.

More particularly, the vertex angle $a$ of frustoconical tip 86' is greater than the vertex angle $b$ of the frustoconical valve seat area 52'. With this arrangement and when the actuating stem is rotated so as to move the valve needle member axially toward the valve seat so that tip 86' will engage the seat, actual initial engagement between the components will be at the uppermost area of the seat at the intersection of face 54' and seat area 52'. This particular configuration is deemed to provide substantial advantages over those valve seat arrangements empolyed with prior values of this general type which were merely defined by a sharp or 90° edge. With these prior arrangements, the sharp edge was coined to the needle tip configuration by the stem force exerted thereaganist during normaly valve operation when the valve was variously adjusted to closed positions. The higher the system fluid pressure, the greater the coining force so that at very high system pressures, a work hardened seat surface resulted which was in an ultimate, totally unacceptable plastic state.

The seat arrangement of the subject invention as best shown in FIG. 10 is deemed to overcome these prior problems. As the stem force is increased to more tightly close the valve for accommodating elevated system pressures, angle $b$ will be forced or slightly reshaped by action of tip 86' against the valve seat area 52' so as to approach the configuration of angle $a$. While angle $b$ is increasing, the bearing area of the seat area is also increasing so as to carry the stem load. The novelty of angle $b$ is deemed to be in permitting deformation of the valve seat area at both low and maximum stem loads within the elastic state of the seat material. At low stem loads, angle $b$ allows deformation for sealing at a larger diameter and at high stem loads the change in angle $b$ allows deformation at a smaller diameter. Without the elastic deformation thus provided, the valve needle tip and valve seat would demand impractical surface finishes, alignment and concentricity. The subject new design takes advantage of the physical characteristics of the materials involved and provides a longer valve life due to the resilience of the valve seat itself.

The taper angle of face 54' is simply employed for manufacturing convenience and normally it will not exceed 15° from a plane extending transverse to the axis of bore 18'. Because this angle is quite small, its influence upon the mechanics of the seat itself are marginal or non-existent. In the preferred embodiment of the subject invention, vertex angle $a$ is approximately 60° with vertex angle $b$ being somewhat smaller, approximately 54° or 55°. However, angle $a$ may be varied from the preferred 60° angle without departing from the intent or scope of the present invention. Likewise, angle $b$ may be varied although it is deemed important that angle $b$ remain smaller than valve $a$.

While the valve seat arrangement particularly shown in FIGS. 6 and 10 is formed integrally in the valve body, the application thereof is equally applicable to the arrangement shown in FIGS. 1 and 2 where the valve seat is an integral part of end fitting 38. Such a configuration will lend itself to obtaining the same desired operational results when using the replaceable valve seat concept.

With particular reference to FIGS. 8 and 9, it will be seen that packing nut 140' has a hexagonal configuration comprised of six side walls 218. Locking bracket 160' cooperates with the packing nut to retain it in a final adjusted position once it has been threadedly advanced into the valve body to apply the desired compressive force against the alignment bushing and sealing medium. This locking bracket is comprised of a body portion 220, a mounting portion 222 and a transition wall 224 which interconnects portions 220 and 222. The locking bracket may be constructed from any rigid material although the preferred construction is comprised of a sheet metal stamping.

Body portions 220 include a locking opening 226, a portion of which is closely received over and communicates with sides 218 of the packing nut. Mounting portion 222 includes an arcuate mounting slot 228 which receives a conventional threaded fastener 162'. The locking opening is defined by a plurality of sides 230 which are disposed relative to each other so as to define a closed star-like configuration. Preferably, and with the hexagonal shaped packing nut 140', locking opening 226 will have 24 of sides 230 which are arranged to define a 12-pointed star-like configuration. As shown in FIG. 8, when locking opening 226 is received over packing nut 140', the corners of the hexagonal packing nut are engaged by alternate ones of the points in the star-like configuration. The preferred arrangement of the locking opening which has a 12-pointed star-like configuration provides for a certain amount of relative adjustment between the locking bracket and packing nut by simply moving the locking bracket so that the packing nut is engaged by the other of the points in opening 226.

The radius of curvature of arcuate mounting slot 228 is taken from the center of locking opening 226 so that the bracket may be arcuately swung through a limited arc until one end or the other of the slot engages threaded fastener 162. The locking bracket has opposed tapered side edges 232,234 which taper from a maximum width at body portion 220 toward a minimum width adjacent the outermost end of mounting portion 222. As will be noted in FIG. 8, the maximum width of the body portion is no greater than the maximum width of valve body 10 at top end 12'. This dimensional relationship assures that there will be no overhang of the locking bracket upon which clothing, tools, equipment and the like could be caught to cause injury or system damage.

The taper between side edges 232,234 is such that whatever the final adjusted position of the locking bracket may be, there will be no overhang from valve body 10' of any portion of the bracket. Thus, the taper of the bracket side edges is made so that the vertex angle thereof is equal to the amount of arc through which the bracket may be moved about threaded fastener 162' before one end or the other of the slot is engaged thereby. In this manner, the mounting portion of the locking bracket will not extend outwardly beyond the maximum width of the bracket at the locking portion. In the preferred embodiment of the locking bracket here under discussion, it is contemplated that both the vertex angle of tapered edges 232,234 and the amount of arc through which the locking bracket may be rotated about threaded fastener 162' will be 30°. However, greater or lesser angles may be advantageously employed without departing from the intent or scope of the present invention.

In the FIG. 6 valve arrangement, the valve actuating stem or shaft 170' and bonnet nut 140' are configured so that the stem may be operably interconnected at the outermost end thereof by conventional means generally designated 250 to a pneumatic drive valve or actuator generally designated 252. This actuator may be energized as desired in order to move the stem and valve needle 80' between the valve open and valve closed positions. Actuator 252 may, of course, be energized from a remote station if so desired. Although a pneumatic actuator 252 has been disclosed, it will be appreciated by those skilled in the art that alternate drive means could be advantageously employed without departing from the intent or scope of the present invention.

Inasmuch as stem 170' is only reciprocably driven when using this arrangement, certain modifications to the cooperating areas between the stem and bonnet nut must be made. Accordingly, stem 170' does not include external threads 176 and this area of the stem is simply manufactured to have a smooth surface area 254 with a slightly larger diameter than the remaining portions of the stem. Further, bonnet nut 140' would be typically constructed from stainless steel in the arrangement here under discussion although, again, other materials could also be employed without departing from the intent and scope of the invention. Moreover, bonnet nut 140' does not include internal threads 150 and this area has simply been replaced by a smooth walled bore portion 256. Also, bonnet nut 140' includes a slightly enlarged bore portion 258 at the innermost or open end thereof. Finally, an open ended cylindrical bronze sleeve bearing or bushing 260 is received in bore portion 258 in a force fit relationship to retain the sleeve in position. The stem, through area 254 is closely received in the sleeve in order to permit selective reciprocal movement thereof by actuator 252 between the valve open and closed positions.

Since stem 170' is only reciprocably driven when utilizing actuator 252, it is possible to manufacture stem 170' and valve needle 80' as a single, integral component. Since there is no rotary movement of the valve needle during valve opening and closing, there is no need to provide for relative rotational movement between stem 170' and valve needle 80' to achieve satisfactory valve operation. The two piece construction shown does, however, provide a degree of lateral adjustment between stem 190' and needle 80' should misalignment be a problem.

It is important to again note that the various modified structures and arrangements shown and described with reference to FIGS. 4 and 6–10 are readily adaptable to and described with reference to FIGS. 1–3 and 5. The purposes of showing the various alternatives and modifications in the specific valve structure of FIGS. 1 and 6 are simply for purposes of permitting those skilled in the art to appreciate the subject invention as well as the versatility thereof in practical application.

As may be noted in both FIGS. 1 and 6, valve bodies 10,10' include threaded openings extending inwardly from top ends 12,12' and through openings extending through side walls 16,16' in communication with each other. These openings do not form a part of the present invention as they have been employed in prior art valves for mounting the valves in a particular desired position to a bracket, wall, base plates or the like. As these types of mounting arrangements are deemed known in the art further elaboration thereon is deemed unnecessary except that threaded fasteners 162,162' are received in one of the threaded openings extending inwardly from top ends 12,12'.

The invention has been described with reference to the preferred embodiments. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. A valve comprising:
 a valve body having an open ended valve chamber including a valve seat disposed between inlet and outlet passages;
 an actuating stem having inner and outer ends;
 a valve needle disposed in said chamber and having a generally cylindrical main body portion with one end operably communicating with the inner end of said stem and the other end including a tip adapted to cooperate with said seat, the portion of said main body portion adjacent said tip having a diameter less than that of said main body portion, said needle being selectively movable by said stem between a first closed position with said tip engaging said seat and a second opened position with said tip spaced from said seat;
 a first seal washer disposed in said chamber adjacent said seat, said first seal washer having a bore slightly larger than the diameter of said needle main body portion and providing a sliding fit therefor;
 a seal member closely received over said valve needle and disposed in said chamber adjacent said first seal washer;
 a second seal washer disposed in said chamber adjacent said seal member, said second seal washer having a bore slightly larger than the diameter of said needle main body portion and providing a sliding fit therefor;
 a valve needle alignment busing disposed adjacent said second seal washer and slidingly received over said valve needle in said valve chamber, said bushing having a first surface engaging said second seal washer and an opposite bushing driving surface,
 a packing nut threadedly received in said valve body coaxial with said valve chamber, said nut having an innermost end engaging said bushing driving surface and urging said bushing against said second seal washer for applying a compressive force against said sealing member, and,
 said bushing and nut having cooperating alignment surfaces engageable generally radially of the longitudinal axis of said valve needle to axially align said bushing with respect to said nut and center said bushing coaxially in said chamber.

2. The valve as defined in claim 1 wherein said packing nut is constructed in one-piece of bronze.

3. The valve as defined in claim 1 wherein said actuating stem has a bifurcated inner end defined by a transverse bore extending through said stem and an axially directed slot extending from said bore to the inner end of said stem, said bore having a generally rectangular cross-sectional shape of substantially uniform size completely through said stem, said slot extending completely across said stem, said slot having a breadth somewhat smaller in magnitude than that of said bore and wherein said one end of said valve needle includes connecting means adapted to be received in the bifurcated inner end of said stem in a manner allowing relative rotation between said stem and valve needle.

4. The valve as defined in claim 3 wherein said connecting means of said valve needle comprises a generally spherical outer end portion adapted to be slidably received in said transverse bore with a portion of said spherical outer end portion being in bearing communication with the top wall of said generally rectangular transverse bore, said connecting means further including a neck portion interconnecting said spherical outer end portion with said main body portion, said neck portion being slidably received in said actuating stem slot.

5. The valve as defined in claim 3 wherein said connecting means of said valve needle comprises generally cylindrical outer end portion adapted to be slidably received in said transverse bore with the upper end of said cylindrical outer end portion being generally flat and in bearing communication with the top wall of said generally rectangular transverse bore, said connecting means further including a neck portion interconnecting said cylindrical outer end portion with said main body portion, said neck portion being slidably received in said actuating stem slot.

6. The valve as defined in claim 1 wherein said valve seat has an entrance area and said valve needle tip is dimensioned so that a portion thereof will be received through said entrance area as said needle is moved toward said first closed position, said valve seat being generally frusto-conically shaped tapering inwardly from said entrance area, said tip including a frusto-conical portion adapted to engage said seat when said needle is moved into said first closed position, and the degree of taper of said valve seat being at least approximately three degrees less than the degree of taper of said tip.

7. The valve as defined in claim 6 wherein the vertex angle of said frusto-conical area of said tip is approximately 60° and the vertex angle of said frusto-conical area of said seat is less than 60°.

8. The valve as defined in claim 1 wherein one of said inlet and outlet passages is coaxially disposed with said valve chamber, said one passage being in a separate member from said valve body and having said valve seat therein, said valve body having a receiving area for said separate member and including a generally frusto-conical area tapering inwardly toward said valve chamber, a portion of said separate member being closely received in said receiving area and engaging said frusto-conical area.

9. The valve as defined in claim 8 wherein said separate member comprises a fitting, the outer end of said fitting adapted to be mounted in a fluid system and the inner end of said fitting including said valve seat, the inner end of said fitting having an exterior frusto-conical shape cooperating with said frusto-conical area of said receiving area.

10. The valve as defined in claim 1 wherein said valve chamber includes a slightly enlarged passage area coaxial therewith at the end thereof remote from said valve seat and said inlet and outlet passages, said slightly enlarged passage area receiving at least said first and second seal washers and said seal member therein, said valve chamber including a further enlarged passage area coaxial therewith at the end of said slightly enlarged passage area remote from said valve seat, and said alignment bushing being received in said further enlarged pressure area and being dimensioned such that at least said first surface is receivable in said slightly enlarged passage against the second seal washer.

11. A valve of the type having a body with a valve chamber which receives a valve needle selectively reciprocal therein between engaging and non-engaging relationships with a valve seat for controlling fluid flow between inlet and outlet passages; compressible sealing means disposed in an enlarged passage adjacent one end and coaxial with said valve chamber for sealing said valve needle; an alignment bushing received over said valve needle for compressing said sealing means into the desired sealing condition with said valve needle; and, a packing nut threadedly received in said valve body generally coaxial with said valve chamber with the lowermost end thereof acting upon said alignment bushing, the improvement comprising:

said alignment bushing having opposed first and second end faces, said alignment bushing being dimensioned for free reception of said first end face in said enlarged passage to apply a compressive force against said sealing means generally axially of said enlarged passage, said second end face including a circumferential groove closely receiving at least a portion of the lowermost end of said packing nut, said groove and nut having cooperating driving surface engaged generally axially of said valve needle to compress said sealing means and having cooperating alignment surfaces engageable generally radially of the longitudinal axis of said valve needle to axially align said bushing with said packing nut and automatically align said bushing in said enlarged passage to automatically align said valve needle in said valve chamber.

12. The improvement as defined in claim 11 wherein said groove in said second end face comprises an L-shaped groove disposed at the outer peripheral edge of said second end face, said packing nut having a bore closely radially receiving a portion of said alignment bushing extending upwardly from the bottom surface of said groove.

13. The improvement as defined in claim 12 wherein said sealing means comprises: a first seal washer disposed in said enlarged passage adjacent said seat, said first seal washer having a bore slightly larger than the diameter of said valve needle and providing a sliding fit for said valve needle; a seal member closely received over said valve needle and disposed in said enlarged passage adjacent said first seal washer; and, a second seal washer disposed in said enlarged passage adjacent said seal member, said second seal washer having a bore slightly larger than the diameter of said valve needle and providing a sliding fit therefor, said alignment bushing first end face acting against said sealing means at said second seal washer.

14. The improvement as defined in claim 13 wherein said first and second seal washers are constructed from a rigid material and said seal member is constructed from a compressible material.

15. The improvement as defined in claim 14 wherein said compressible material comprises filled polytetrafluoroethylene.

* * * * *